(12) United States Patent
Hori et al.

(10) Patent No.: US 6,491,458 B2
(45) Date of Patent: Dec. 10, 2002

(54) PRINTING SYSTEM

(75) Inventors: Yasushi Hori; Minoru Sakaguchi, both of Nagano (JP)

(73) Assignee: Nagano Japan Radio Co., Ltd., Nagano-Ken (JP)

( * ) Notice: Subject to any disclaimer, the term of this patent is extended or adjusted under 35 U.S.C. 154(b) by 56 days.

(21) Appl. No.: 09/758,435

(22) Filed: Jan. 12, 2001

(65) Prior Publication Data

US 2001/0008595 A1 Jul. 19, 2001

(30) Foreign Application Priority Data

Jan. 14, 2000 (JP) ........................................ 2000-006849

(51) Int. Cl.$^7$ ............................................... B41J 11/42
(52) U.S. Cl. .................. 400/582; 400/120.09; 347/188
(58) Field of Search ................................ 400/582, 613, 400/626, 633.1, 624, 196, 207, 62, 120.09, 120.03, 73; 347/23, 188

(56) References Cited

U.S. PATENT DOCUMENTS

| | | | |
|---|---|---|---|
| 4,774,525 A | * | 9/1988 | Mitsushima et al. .......... 346/76 |
| 4,998,216 A | * | 3/1991 | Hino et al. ................. 364/519 |
| 5,444,468 A | * | 8/1995 | Fukushima et al. ........... 347/14 |
| 6,079,885 A | * | 6/2000 | Sano ........................... 400/76 |
| 6,350,072 B1 | * | 2/2002 | Nunes et al. ................ 400/188 |

FOREIGN PATENT DOCUMENTS

JP 2-206573 8/1990

* cited by examiner

Primary Examiner—Andrew H. Hirshfeld
Assistant Examiner—David N. Cone
(74) Attorney, Agent, or Firm—Birch, Stewart, Kolasch & Birch, LLP

(57) ABSTRACT

A printing system includes a printing apparatus and a computer. The printing apparatus and the computer each include a density setting section. The printing system further includes a data processing section, which is at least adapted to transfer printing density data for a predetermined printing object from the computer to the printing apparatus so as to set printing density on the printing apparatus and to transfer printing density data for a predetermined printing object from the printing apparatus to the computer in order to store the printing density data in a database. Since printing density can be set on either of the printing apparatus and the computer, for example, in a trial printing mode, printing density data are transferred from the database stored in the computer to the printing apparatus so as to set printing density on the printing apparatus, thereby enabling trial printing. When the printing density set on the printing apparatus is modified on the basis of the result of the trial printing, the modified printing density data are transferred to the computer to thereby update the database accordingly.

9 Claims, 4 Drawing Sheets

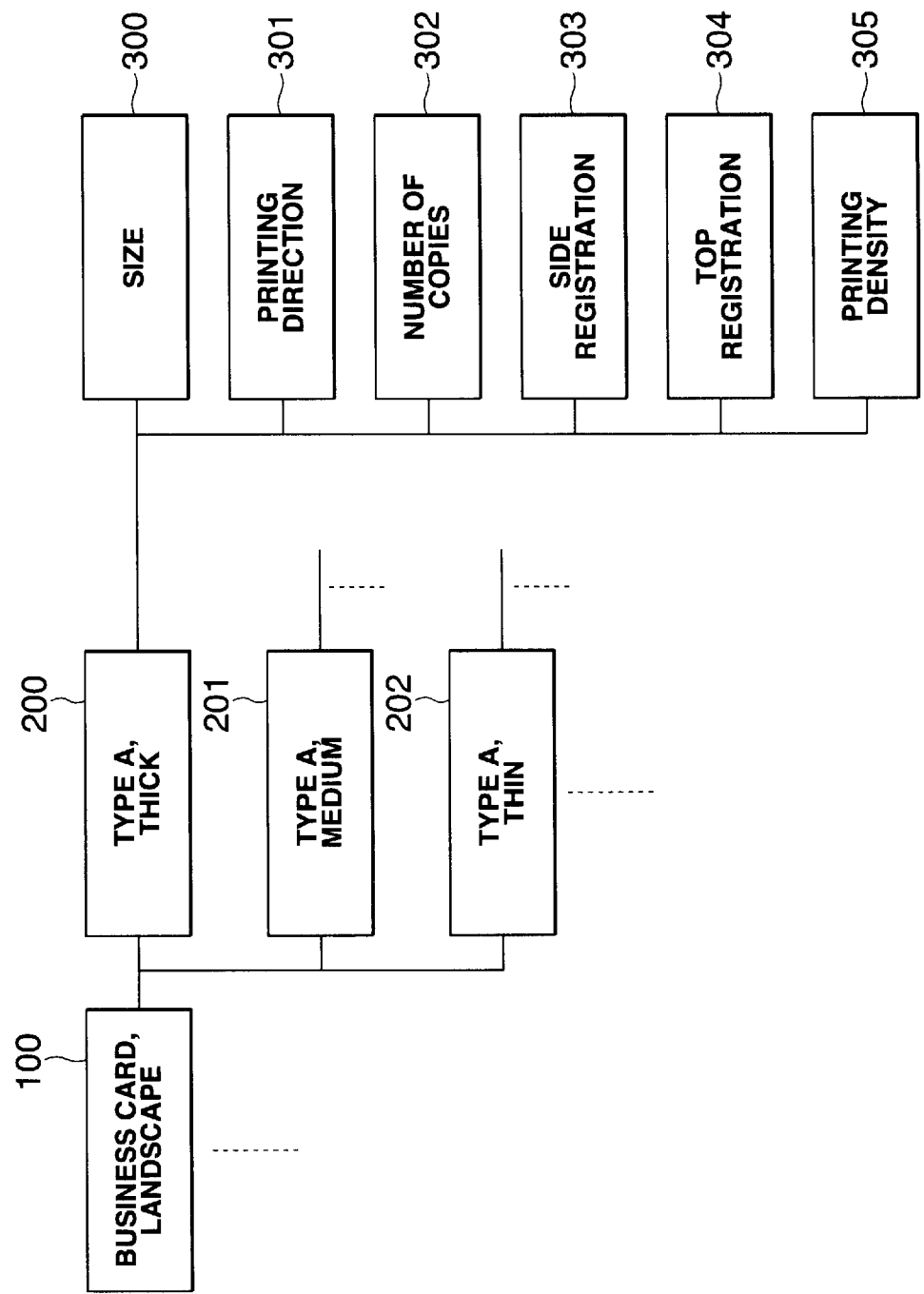

PRINTING SYSTEM

BACKGROUND OF THE INVENTION

1. Field of the Invention

The present invention relates to a printing system used favorably for printing relatively small objects that require printing (hereinafter referred to as "printing objects"), such as business cards or postcards.

2. Description of the Related Art

A conventional printing apparatus for printing a printing object of relatively small size, such as a business card or a postcard, is disclosed in, for example, Japanese Patent Application Laid-Open (kokai) No. 8(1996)-206573.

Such a printing apparatus is usually connected to a computer. Printing data are transferred from the computer to the printing apparatus, and a printer driver installed in the computer controls the printing apparatus so as to carry out printing. In the printing apparatus, printing objects are sequentially fed from a paper feed mechanism and transported to a printing mechanism by means of a front-stage transport mechanism. The printing mechanism prints the printing objects through thermal transfer printing by use of a thermal head and an ink ribbon. The thus-printed objects are transported by means of a rear-stage transport mechanism and delivered onto a paper delivery tray.

However, the above-mentioned conventional printing apparatus (printing system) involves the following problem.

A general-purpose printer is primarily intended to print on plain paper. Thus, once printing density is initially set, no further adjustment is necessary with respect to printing density. Accordingly, in the general-purpose printer, a function for setting printing density is imparted merely to the printer. By contrast, in the case of printing special printing objects, such as business cards, printing density must be adjusted optimally according to paper material and paper thickness in order to attain high printing quality, since paper material and paper thickness vary greatly among types of printing objects. However, since the conventional printing system utilizes the functions of a general-purpose printer as they are, the conventional printing system fails to provide sufficient utility with respect to adjustment (setting) of printing density, and thus involves problems in terms of convenience of use.

The above-mentioned conventional printing apparatus (printing system) also involves the following problem.

Whenever the type of a printing object is changed, printing density must be set (adjusted), causing burdensome adjustment work and waste of time and printing objects. Even when printing objects of the same type are printed, printing quality varies depending on when the objects are printed.

SUMMARY OF THE INVENTION

An object of the present invention is to provide a printing system enabling easy, accurate setting of printing density for a printing object; for example, enabling use of the density-setting function of a printing apparatus without termination of a progressing process on the computer side, as well as having sufficient utility with respect to adjustment (setting) of printing density, thereby significantly enhancing convenience of use.

Another object of the present invention is to provide a printing system which does not necessarily require setting (adjustment) of printing density even when the type of a printing object is changed, thereby avoiding burdensome adjustment work and waste of time and printing objects, as well as avoiding variations in printing quality to thereby maintain high printing quality at all times.

To achieve the above objects, the present invention provides a printing system comprising a printing apparatus and a computer which is connected to the printing apparatus. In the printing system, printing data are transferred from the computer to the printing apparatus, and the printing apparatus is controlled by a printer driver installed in the computer. The printing apparatus and the computer each comprise a density setting section. The printing system further comprises a data processing section, which is at least adapted to transfer printing density data for a predetermined printing object from the computer to the printing apparatus so as to set printing density on the printing apparatus and to transfer printing density data for a predetermined printing object from the printing apparatus to the computer in order to store the printing density data in a database.

Since printing density can be set on either of the printing apparatus and the computer in, for example, a trial printing mode, printing density data are transferred from a database stored in the computer to the printing apparatus so as to set printing density on the printing apparatus, thereby enabling trial printing. When the printing density set on the printing apparatus is modified on the basis of the result of the trial printing, the modified printing density data are transferred to the computer to thereby update the database accordingly.

BRIEF DESCRIPTION OF THE DRAWINGS

FIG. 4 is a block diagram showing classified printing objects to be handled by the printing system and setting items for each of the printing objects.

DETAILED DESCRIPTION OF THE PREFERRED EMBODIMENT

Figure 1:
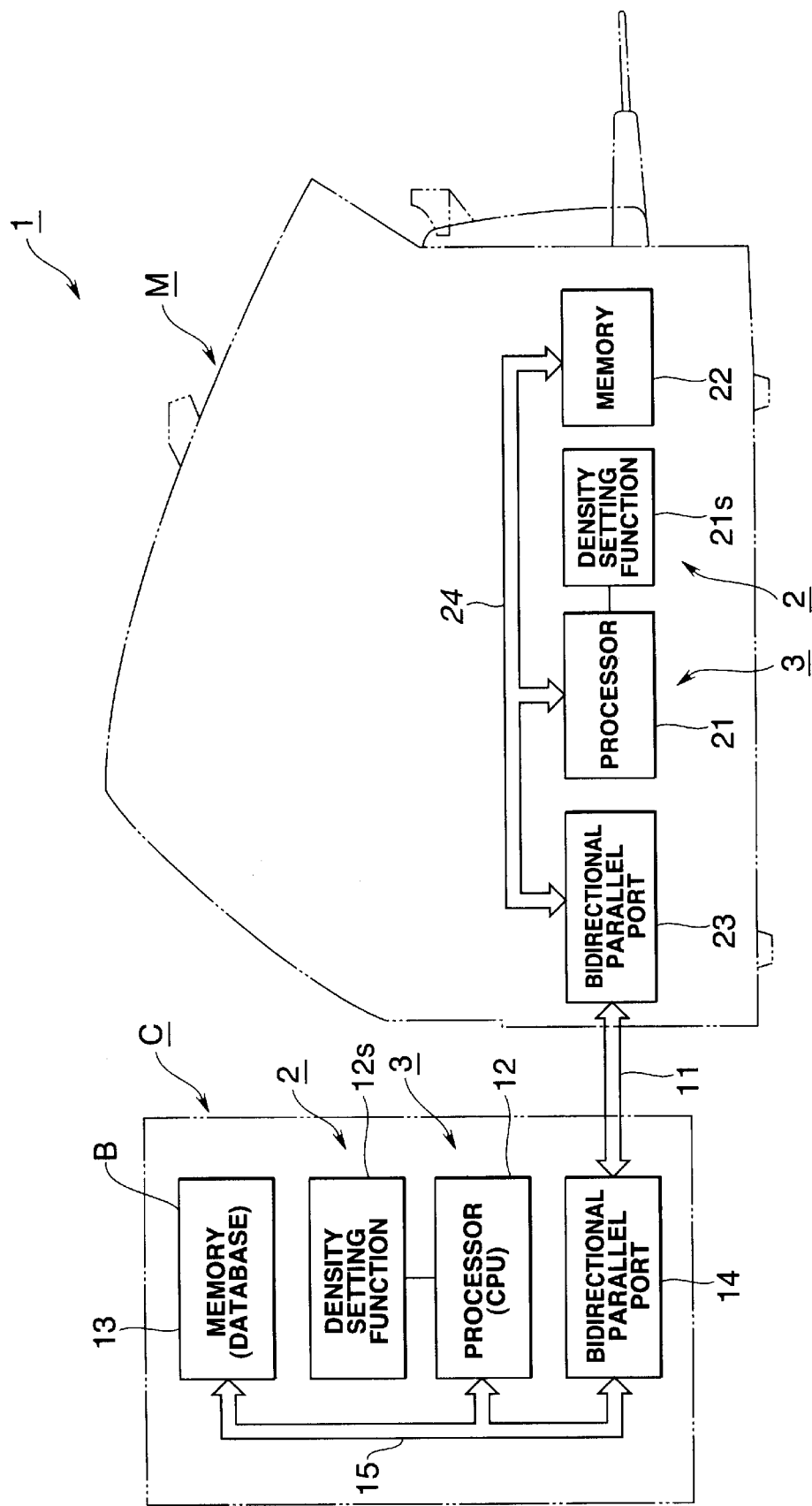
FIG. 1 is a schematic block diagram showing a main portion of a printing system according to an embodiment of the present invention.

An embodiment of the present invention will next be described in detail with reference to the drawings. The accompanying drawings are illustrative of the embodiment and are not meant to limit the scope of the invention. In order to describe the invention clearly, detailed description of known parts is omitted.

First, the overall configuration of a printing system 1 according to the present embodiment will be described with reference to FIG. 1.

The printing system 1 includes a printing apparatus M and a computer C, which are connected via a connection cable 11. A general-purpose personal computer may be employed as the computer C. The computer C includes a processor 12 including a CPU; a memory 13 including a hard disk, a ROM, and a RAM; and a bidirectional parallel port 14. These components of the computer C are connected by means of a bus line 15. Printing density data D for a predetermined printing object P are stored in a database B on the hard disk of the memory 13,. Software for effecting a printer driver is installed in the computer C so as to provide a density setting function 12s, which can set printing density on the printing apparatus M.

The printing apparatus M includes a control system shown in FIG. 1. The control system includes a processor 21, a memory 22, and a bidirectional parallel port 23. These components of the control system are connected by means of a bus line 24. The printing apparatus M further includes a density setting function 21s adapted to set printing density. The bidirectional parallel port 14 of the computer C and the bidirectional parallel port 23 of the printing apparatus M are connected by means of the connection cable 11.

Thus is configured the printing system 1 for carrying out printing while transferring printing data from the computer C to the printing apparatus M and controlling the printing apparatus M by means of a printer driver installed in the computer C. The printing system 1 comprises a density setting section 2 for setting printing density on the computer C side, which is realized by the density setting function 12s, as well as a density setting section 2 for setting printing density on the printing apparatus M side, which is realized by the density setting function 21s. The printing system 1 further comprises a data processing section 3. The data processing section 3 transfers printing density data D for a predetermined printing object P from the computer C to the printing apparatus M so as to set printing density on the printing apparatus M and transfers printing density data for a predetermined printing object P from the printing apparatus M to the computer C in order to store the printing density data D in a database B. The printing apparatus M is specialized in printing special printing objects P including business cards, postcards, and envelopes.

Figure 2:
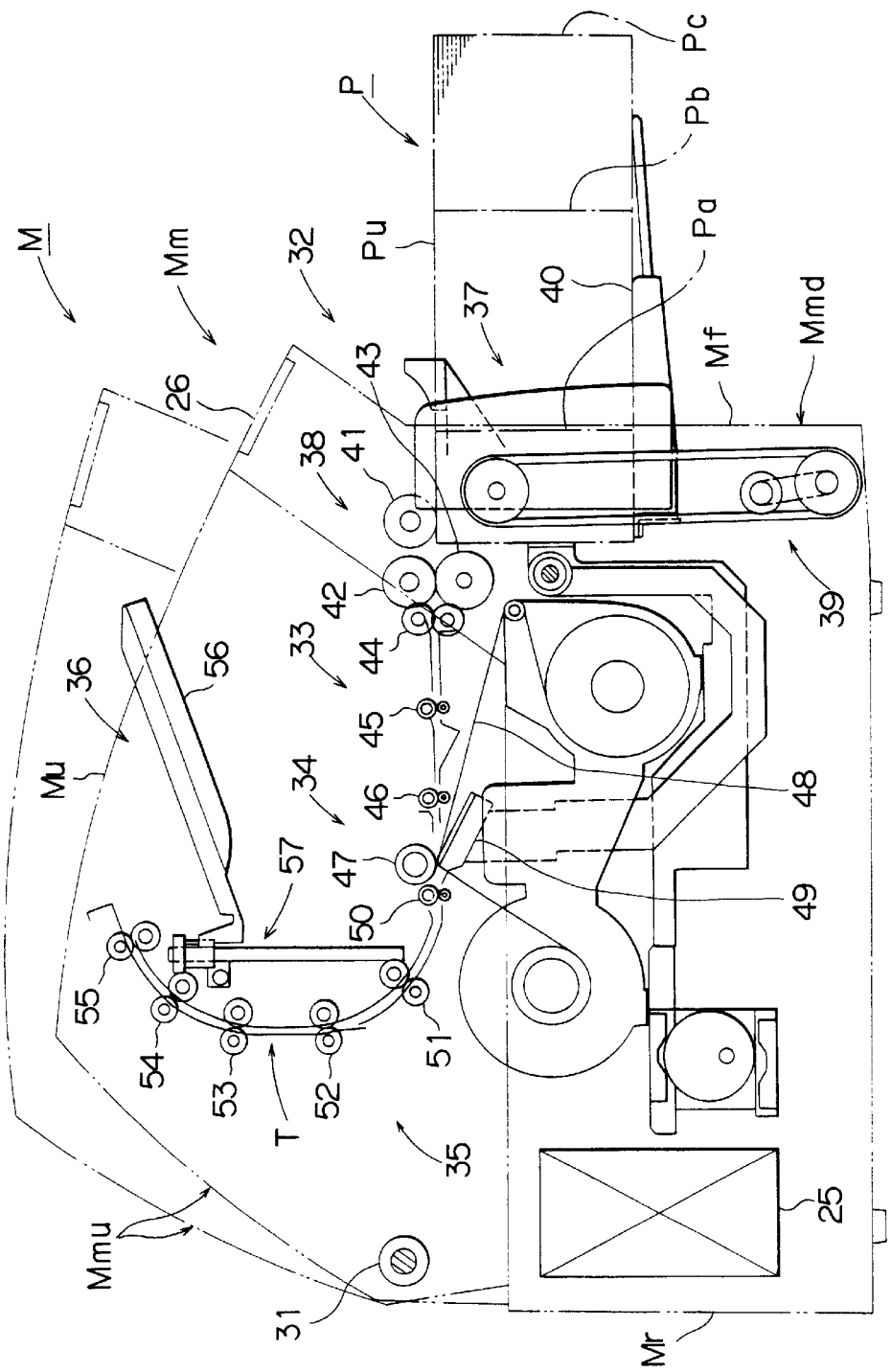
FIG. 2 is a schematic diagram showing the mechanical configuration of a printing apparatus of the printing system.

Next, the mechanical configuration of the printing apparatus M, which partially constitutes the printing system 1 according to the present embodiment, will be described with reference to FIG. 2.

The printing apparatus M includes an apparatus body Mm, which in turn includes an apparatus-body lower-section Mmd and an apparatus-body upper-section Mmu. The apparatus-body upper-section Mmu opens and closes vertically with respect to the apparatus-body lower-section Mmd while a hinge member 31 located at a rear portion of the apparatus body Mm serves as a fulcrum. A right-hand section of the apparatus body Mm in FIG. 2 serves as a front section Mf, in which a paper feeder mechanism 32 is disposed. A left-hand section of the apparatus body Mm in FIG. 2 serves as a rear section Mr. A front-stage transport mechanism 33, a printing mechanism 34, a rear-stage transport mechanism 35, and a delivery tray mechanism 36 are disposed sequentially in the apparatus-body upper-section Mmu from the upper side of the paper feeder mechanism 32 toward the rear section Mf of the apparatus body Mf. Reference numeral 25 denotes a control unit, which includes the above-described processor 21, memory 22, etc. Reference numeral 26 denotes an operation panel.

The paper feeder mechanism 32 includes a paper feed guide mechanism 37 for accommodating a number of printing objects P and a paper feed roller mechanism 38 for delivering the printing objects P one after another from the paper feed guide mechanism 37. The paper feed guide mechanism 37 includes a paper feed elevator mechanism 39 and a paper feed tray 40, which is raised by the paper feed elevator mechanism 39 and can be lowered manually. A number of printing objects P are stacked on the paper feed tray 40. The printing objects P to be stacked on the paper feed tray 40 are business cards Pa in the landscape position, postcards Pb in the portrait position, and envelopes Ps in the portrait position. A top-surface position Pu of the stacked printing objects P is detected by an unillustrated sensor and is maintained at a height falling within a constant range through controlled operation of the paper feed elevator mechanism 39. The paper feed roller mechanism 38 includes a pickup roller 41 for feeding forward the printing object P along the direction of transport while abutting the top surface of the stacked printing objects P; a feed roller 42 disposed ahead of the pickup roller 41 in the direction of transport; and a retard roller 43 disposed below the feed roller 42. The paper feed roller mechanism 38 feeds forward the printing objects P one after another by means of the feed roller 42 and the retard roller 43.

The front-stage transport mechanism 33 includes a take-away roller mechanism 44, a pre-registration roller mechanism 45, and a registration roller mechanism 46, which are sequentially disposed in the horizontal direction. The front-stage transport mechanism 33 is adapted to transport the printing objects P delivered from the paper feed roller mechanism 38 to the printing mechanism 34.

The printing mechanism 34 includes a platen roller 47 disposed above a transport path for the printing object P, an ink ribbon 48 disposed below the transport path, and a print head 49 disposed below the transport path and employing a thermal head. The printing mechanism 34 carries out printing through thermal transfer. Since the printing mechanism 34 carries out printing for thick or hard printing objects P, such as business cards and postcards, the print head 49 employs a thermal head of the C end face type so as to ensure printing for such printing objects P. Since the thermal head of the C end face type is apt to cause curling of the printing object P, a rubber roller having a rubber hardness of not less than 80 degrees is employed as the platen roller 47, to thereby prevent occurrence of such curling. A printing mechanism 34 of such a type is apt to cause unstable transport of the printing object P. In order to avoid such unstable transport, the distance between the registration roller mechanism 46 and a first transfer roller mechanism 50, which will be described later, is rendered to be shorter than the dimension of a printing object P of minimum size as measured in the direction of transport, whereby the printing object P which is undergoing printing is gripped at two different positions in the direction of transport, thereby avoiding any adverse effect on printing quality which would otherwise result from unstable transport in the printing mechanism 34.

The rear-stage transport mechanism 35 includes sequentially a first transfer roller mechanism 50, a second transfer roller mechanism 51, a third transfer roller mechanism 52, a fourth transfer roller mechanism 53, a fifth transfer roller mechanism 54, and a sixth transfer roller mechanism 55. The rear-stage transport mechanism 35 is adapted to transport the printing object P which has undergone printing effected by the printing mechanism 34, to the delivery tray mechanism 36. The roller mechanisms 50 to 55 define a transport path T, which assumes the form of a letter U. The printing object P delivered from the printing mechanism 34 is transported along a U-shaped path. Specifically, the printing object P is transported upward and then frontward (rightward in FIG. 2) for delivery. The distance between the roller mechanisms 50 to 55 is rendered to be shorter than the dimension of a printing object P of minimum size as measured in the direction of transport. The radius of curvature R of the transport path T in the shape of the lying letter U is not greater than 60 mm, thereby ensuring smooth and stable transport of thick printing objects P, such as business cards and postcards.

The delivery tray mechanism 36 includes a delivery tray 56. The delivery tray 56 is disposed in such a manner so as to project into the interior space (project below a delivery end portion) of the rear-stage transport mechanism 35. Since the delivery tray 56 is disposed at an upper-surface portion Mu of the apparatus-body upper-section Mmu, and the printing objects P are delivered frontward from the rear-stage transport mechanism 35, the printing objects P are stacked one after another on the delivery tray 56 while the printed surfaces thereof face upward. The rear end (left-hand end in FIG. 2) of the delivery tray 56 is supported by an elastic support mechanism 57. Thus, as the number of printing objects P stacked on the delivery tray 56 increases, the delivery tray 56 become lower.

Figure 3:
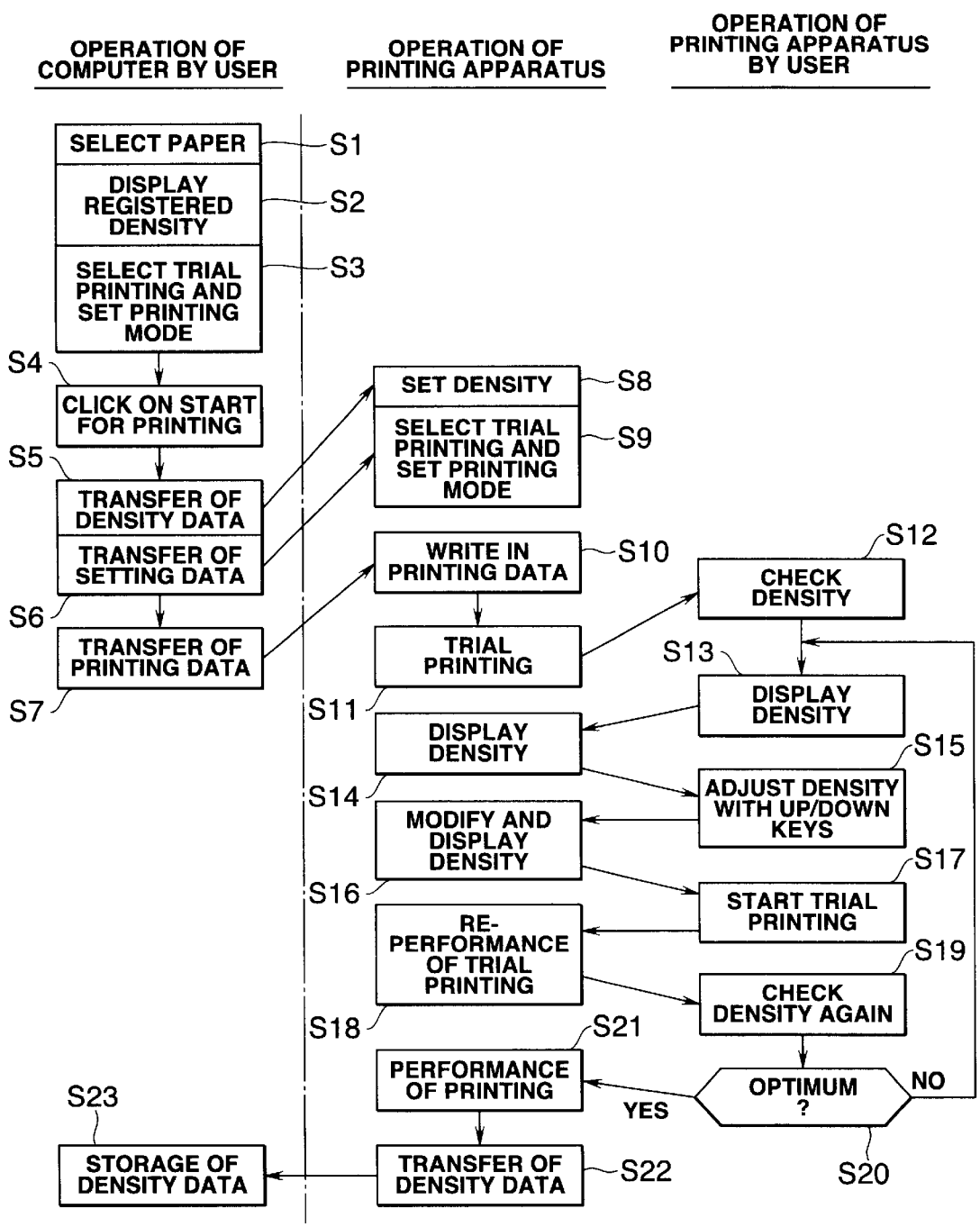
FIG. 3 is a flowchart for explaining the operation (function) of the main portion of the printing system.

Next, the operation (function) of a main portion of the printing system 1 will be described with reference to the drawings and according to the flowchart shown in FIG. 3. Notably, software for effecting a printer driver is installed beforehand in the computer C.

First, an application program installed in the computer C is started so as to open a printing screen on a display. When business cards, for example, are to be printed, printing data for the business card are displayed on the display. Next, a printer setting screen is opened thereby enabling selection of a business card as a printing object P (step SI).

A user can select as the printing object P from among a business card, a postcard, and an envelope. Also, the user can select from among a plurality of orientations for printing and types. In the case of a business card, as shown in FIG. 4, the user can select as an orientation for printing between a landscape position 100 and a portrait position and can select as a type from among types A, B, C, etc., which are classified according to, for example, size and paper material as well as from among thick 200, medium 201, and thin 202. For the thus-selected printing object P, the user can set size 300, printing direction 301, number of copies 302, side registration 303, top registration 304, and printing density 305.

Next, the user causes the computer C to display on a printer driver screen the printing density data D which was employed in the last printing for the selected printing object P (business card) (step S2). Since the computer C retains the printing density data D for predetermined printing objects P in the database B, the printing density data D for the selected printing object P; i.e., a business card, are read from the database B and displayed. On the printer setting screen, the user selects a trial printing mode and sets a printing mode (step S3). Then, the user clicks on START (step S4). The computer C transfers the printing density data D, information regarding selection of the trial printing mode, set data regarding a printing mode, and printing data (image data) to the printing apparatus M (steps S5, S6, and S7).

In the printing apparatus M, energy to be applied to the print head (thermal head) 49 is determined (set) on the basis of the received printing density data D. On the basis of the received information about selection of the trial printing mode and the received set data regarding a printing mode, the printing apparatus M is set up accordingly (steps S8 and S9). The received image data are developed on the memory (RAM) 22 (step S10).

Upon completion of the above setup, the printing apparatus M prints a single business card as a trial (step S11). Upon completion of the trial printing, the user judges whether or not printing density is acceptable (step S12). When the user judges the printing density to be acceptable, the user starts regular printing; specifically, the user turns ON the START key on the printing apparatus M. When the user judges the printing density to be unacceptable, the user modifies the set printing density by means of the density setting function 21s of the printing apparatus M. The density setting function 12s of the computer C may be used for modifying the set printing density. However, use of the density setting function 12s involves troublesome work; specifically, termination of a process in progress on the computer C and opening of the printer setting screen for performing setting. By contrast, use of the density setting function 21s of the printing apparatus M allows a process in progress on the computer C to remain in an uninterrupted condition. In the printing system 1 according to the present embodiment, the printing apparatus M and the computer C each include the density setting section 2, thereby enabling easy, accurate setting of printing density for a printing object P and providing sufficient utility with respect to adjustment (setting) of printing density. Thus, the printing system 1 provides significantly enhanced convenience of use.

When the set printing density is to be modified by means of the density setting function 21s of the printing apparatus M, the user first operates a SET key so as to display the set printing density on the operation panel 26 of the printing apparatus M (steps S13 and S14). Next, the user adjusts printing density through operation of an UP key or a DOWN key. The DOWN key is adapted to decrease printing density, whereas the UP key is adapted to increase printing density (step S15). The thus-modified printing density is displayed on the operation panel 26 (step S16).

Next, the user turns on a TRIAL PRINTING key on the printing apparatus M (step 17). A trial printing is performed again (step S18). Upon completion of the trial printing, the user judges again whether or not printing density is acceptable (step S19). When the user judges the modified printing density to be unacceptable, steps S13 to S19 are repeated. When the user judges the modified printing density to be acceptable, regular printing is started (step S20). In order to start regular printing, the user turns ON the START key.

The printing apparatus M starts regular printing and prints a set number of copies (step S21). The printing apparatus M transfers the modified printing density data D to the computer C (step S22). The computer C stores the received printing density data D in the database B (step S23), thereby updating the database B. The thus-stored printing density data D in the data base B are used as initial data in the next trial printing.

Thus, the printing system 1 of the present embodiment does not necessarily require setting (adjustment) of printing density even when the type of a printing object P is changed, thereby avoiding burdensome adjustment work and waste of time and printing objects P as well as avoiding variations in printing quality to thereby maintain high printing quality at all times.

The present invention is not limited to the above-described embodiment. Regarding structural details, shape, material, quantity, technique, and the like, modifications and any omission or addition may be possible as needed without departing from the scope of the invention. For example, the above embodiment has been described while mentioning process involved in the trial printing mode. However, process (operation) similar to that involved in the trial printing mode may be performed during regular printing. The data processing section 3 is not limited in processing function to that described above, but can perform various kinds of processes which become necessary to perform due to provision of the density setting section 2 in each of the printing apparatus M and the computer C. The above embodiment is described while mentioning a business card, a postcard, and an envelope as examples of a printing object P. However, the present invention is not limited thereto. Examples of a printing object P include various printing objects, such as cards and labels.

What is claimed is:

1. A printing system comprising:

a printing apparatus for performing printing;

a computer connected to the printing apparatus, the computer transferring printing data to the printing apparatus and controlling the printing apparatus by means of a printer driver installed in the computer;

a first density setting section provided in the printing apparatus and adapted to set the density of printing performed by the printing apparatus;

a second density setting section provided in the computer and adapted to set the density of printing performed by the printing apparatus; and a data processing section adapted to transfer printing density data for a predetermined printing object from the computer to the printing apparatus so as to set printing density on the printing apparatus and to transfer printing density data for a predetermined printing object from the printing apparatus to the computer in order to store the printing density data in a database provided in the computer.

2. A printing system according to claim 1, wherein the printing system has a trial printing mode in which printing density data for a predetermined printing object are transferred from the database stored in the computer to the printing apparatus, and printing is performed on trial through use of the printing density data before regular printing for the printing object is started.

3. A printing system according to claim 2, wherein when printing density is modified on the basis of the result of printing in the trial printing mode, the modified printing density data for the predetermined printing object are transferred to the computer so as to update the database accordingly.

4. A printing system according to claim 1, wherein the printing apparatus is dedicated to printing for a printing object selected from business cards, postcards, and envelopes.

5. A printing system according to claim 1, wherein the printing apparatus comprises a paper feed mechanism disposed at a front section of an apparatus body and adapted to feed paper; a front-stage transport mechanism for transporting paper fed from the paper feed mechanism to a rear section of the apparatus body; a printing mechanism disposed below a transport path for paper transported by means of the front-stage transport mechanism, the printing mechanism including a print head and an ink ribbon so as to perform printing; a rear-stage transport mechanism for transporting paper printed by means of the printing mechanism along a U-shaped path; and a delivery tray mechanism disposed at an upper-surface portion of the apparatus body in such a manner as to project into an interior space of the rear-stage transport mechanism and adapted to receive paper delivered from the rear-stage transport mechanism.

6. A printing system according to claim 5, wherein the apparatus body comprises an apparatus-body lower-section and an apparatus-body upper-section connected to the apparatus-body lower-section via a hinge member provided at a rear portion of the apparatus body such that the apparatus-body upper-section can be opened and closed vertically with respect to the apparatus-body lower-section, and wherein the apparatus-body lower-section comprises a cassette magazine into which an ink ribbon cassette is loaded while the apparatus-body upper-section is opened.

7. A printing system according to claim 5, wherein the paper feed mechanism comprises a paper feed guide mechanism for accommodating a number of sheets of paper; a paper feed roller mechanism for delivering the sheets of paper one after another from the paper feed guide mechanism; and a paper feed elevator mechanism for maintaining a top-surface position of sheets of paper stacked on a paper feed tray of the paper feed guide mechanism at a height falling within a constant range.

8. A printing system according to claim 5, wherein the radius of curvature of the transport path is not greater than 60 mm.

9. A printing system according to claim 5, wherein the delivery tray mechanism comprises a delivery tray and an elastic support mechanism, which lowers as the number of sheets of paper on the delivery tray increases.

\* \* \* \* \*